United States Patent
Watanabe et al.

(10) Patent No.: US 10,632,875 B2
(45) Date of Patent: Apr. 28, 2020

(54) VEHICLE SEAT WITH WALK-IN MECHANISM

(71) Applicant: TACHI-S CO., LTD., Akishima-shi, Tokyo (JP)

(72) Inventors: Akira Watanabe, Tokyo (JP); Takayuki Ohmori, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/093,646

(22) PCT Filed: Apr. 28, 2017

(86) PCT No.: PCT/JP2017/017084
§ 371 (c)(1),
(2) Date: Oct. 14, 2018

(87) PCT Pub. No.: WO2017/199740
PCT Pub. Date: Nov. 23, 2017

(65) Prior Publication Data
US 2019/0070987 A1 Mar. 7, 2019

(30) Foreign Application Priority Data
May 20, 2016 (JP) ................................. 2016-101806

(51) Int. Cl.
*B60N 2/433* (2006.01)
*B60N 2/20* (2006.01)
*A47C 7/40* (2006.01)

(52) U.S. Cl.
CPC ............... *B60N 2/433* (2013.01); *B60N 2/20* (2013.01); *B60N 2/206* (2013.01); *A47C 7/407* (2013.01)

(58) Field of Classification Search
CPC . B60N 2/433; B60N 2/20; B60N 2/22; B60N 2/206; A47C 7/407
See application file for complete search history.

(56) References Cited

U.S. PATENT DOCUMENTS 3,628,831 A * 12/1971 Close ....................... B60N 2/20
  297/378.11
4,518,190 A * 5/1985 Kluting .................. B60N 2/433
  180/286
(Continued)

FOREIGN PATENT DOCUMENTS

JP      2524571 Y2     2/1997
JP    2004-257104 A    9/2004
(Continued)

OTHER PUBLICATIONS

International Search Report from International Patent Application No. PCT/JP2017/017084, dated Jul. 18, 2017.
(Continued)

*Primary Examiner* — Philip F Gabler
(74) *Attorney, Agent, or Firm* — SGPatents PLLC

(57) ABSTRACT

The purpose of the present invention is to provide, in a vehicle seat having a walk-in mechanism, a locking mechanism for a seat back with which rotation of a lock plate can be suppressed against impact in any direction, and with which the locked state can be more reliably retained. In order to achieve the foregoing, provided is a vehicle seat having a walk-in mechanism, wherein: a reclining unit having the walk-in mechanism comprises a swing plate and latch for locking a seat back at a seated posture position; the latch has a structure that rotates about a latch rotating shaft, locks rotation of the seat back by meshed engagement with the swing plate, and releases the lock when the meshed engagement with the swing plate comes out; and the latch is given a structure with which a counter plate is added to the opposite side from the position of meshed engagement with the swing plate, relative to the latch rotating shaft, and the center-of-gravity position of the latch is brought close to the center of rotation of the latch.

5 Claims, 3 Drawing Sheets

(56) References Cited

U.S. PATENT DOCUMENTS

| | | | | | |
|---|---|---|---|---|---|
| 5,058,240 | A | * | 10/1991 | Barda .................... | B60N 2/433 |
| | | | | | 16/325 |
| 5,100,202 | A | * | 3/1992 | Hughes .................. | B60N 2/433 |
| | | | | | 297/378.11 |
| 5,370,440 | A | * | 12/1994 | Rogala ................... | B60N 2/433 |
| | | | | | 297/216.14 |

FOREIGN PATENT DOCUMENTS

| | | |
|---|---|---|
| JP | 2008-296659 A | 12/2008 |
| JP | 2014-226994 A | 12/2014 |

OTHER PUBLICATIONS

Office Action dated Sep. 3, 2019 in Japanese Patent Application No. 2018-518204.

* cited by examiner (B)

(A)
PRIOR ART

VEHICLE SEAT WITH WALK-IN MECHANISM

TECHNICAL FIELD

The present invention relates to a vehicle seat with a walk-in mechanism, in particular, relates to a lock mechanism of a seat back.

BACKGROUND ART

There is a vehicle seat including, what is called, a walk-in mechanism. In addition to an operation for changing angle of a seat back, the walk-in mechanism enables to release a lock of the seat back to instantaneously make a seat back fall forward, for example, when an occupant moves to a back seat by opening a front side door in a two door typed coupe.

As a background art in this technical field, there is Japanese Patent Application Laid-Open No. 2008-296659 (PTL 1). PTL 1 discloses a mechanism that positions the position of the center of gravity of a lock plate below an axial center position of a turning shaft in a locking device of a vehicle seat back that retains the seat back at a seating posture position by turning the lock plate about the turning shaft and engaging the lock plate with a lock pin, for the purpose of providing a locking device of a vehicle seat back that ensures further reliably retaining a lock state of the seat back at a seating posture position.

CITATION LIST

Patent Literature

PTL 1: Japanese Patent Application Laid-Open No. 2008-296659

SUMMARY OF INVENTION

Technical Problem

In PTL 1, the position of the center of gravity of a whole lock plate is set so as to be positioned below an axial center of a turning shaft and in a vehicle rear side. Even in a case where a luggage loaded in a luggage compartment moves to an occupant compartment side by an inertia force when a sudden braking is applied or when a frontal collision of the vehicle occurs, this is advantageous in restricting the lock plate from turning in a lock releasing direction due to the impact when the luggage collides with a seat back. The position of the center of gravity of the lock plate positioned in the vehicle rear side with respect to the axial center of the turning shaft is advantageous in restricting the lock plate from turning even if the luggage in the luggage compartment collides with the seat back. That is, since the lock plate is configured to be positioned at a lock actuating position by upwardly turning about the turning shaft from a vehicle front side toward the vehicle rear side, increasing a weight of the lock plate in the vehicle rear side keeps the lock plate biased to the lock actuating position by its own weight. Accordingly, PTL 1 describes that the lock plate is less likely to turn in the lock releasing direction from vehicle rear side toward the vehicle front side, and therefore, it is advantageous in restricting an unintended turning of the lock plate.

However, the objective of PTL 1 is a restriction of lock plate turning against an impact from the rear side to the front side due to the impact of the luggage loaded in the luggage compartment caused by the frontal collision of the vehicle or the like, in the structure where the lock plate is configured to be positioned at the lock actuating position by upwardly turning about the turning shaft from the vehicle front side toward the vehicle rear side. Therefore, impacts from directions other than the vehicle rear side, such as an impact thrusting upward, for example, by a vehicle floor broken in a vehicle collision, are not discussed.

The present invention has been made in consideration of these problems, and it is one of its objectives to provide a vehicle seat with a walk-in mechanism including a lock mechanism of a seat back that ensures further reliably retaining a lock state against impacts from any directions.

Solution to Problem

One example of the present invention in order to solve the above-described problems is, a vehicle seat with a walk-in mechanism including a reclining unit that includes the walk-in mechanism. The reclining unit includes a swing plate and a latch for locking a seat back at a seating posture position. The latch has a structure that turns about a latch rotation shaft, locks the turning of the seat back by engaging with the swing plate, and releases the lock by disengaging from the swing plate. The latch has a structure in which a counter plate is added on an opposite side of a position where the latch engages with the swing plate with respect to the latch rotation shaft, and a position of a center of gravity of the latch is brought close to a rotational center of the latch.

Advantageous Effects of Invention

With the present invention, a vehicle seat with a walk-in mechanism including a lock mechanism of a seat back that ensures further reliably retaining a lock state against impacts from any directions can be provided.

DESCRIPTION OF EMBODIMENTS

The following describes an example of the present invention with reference to the drawings.

EXAMPLE

Figure 3:
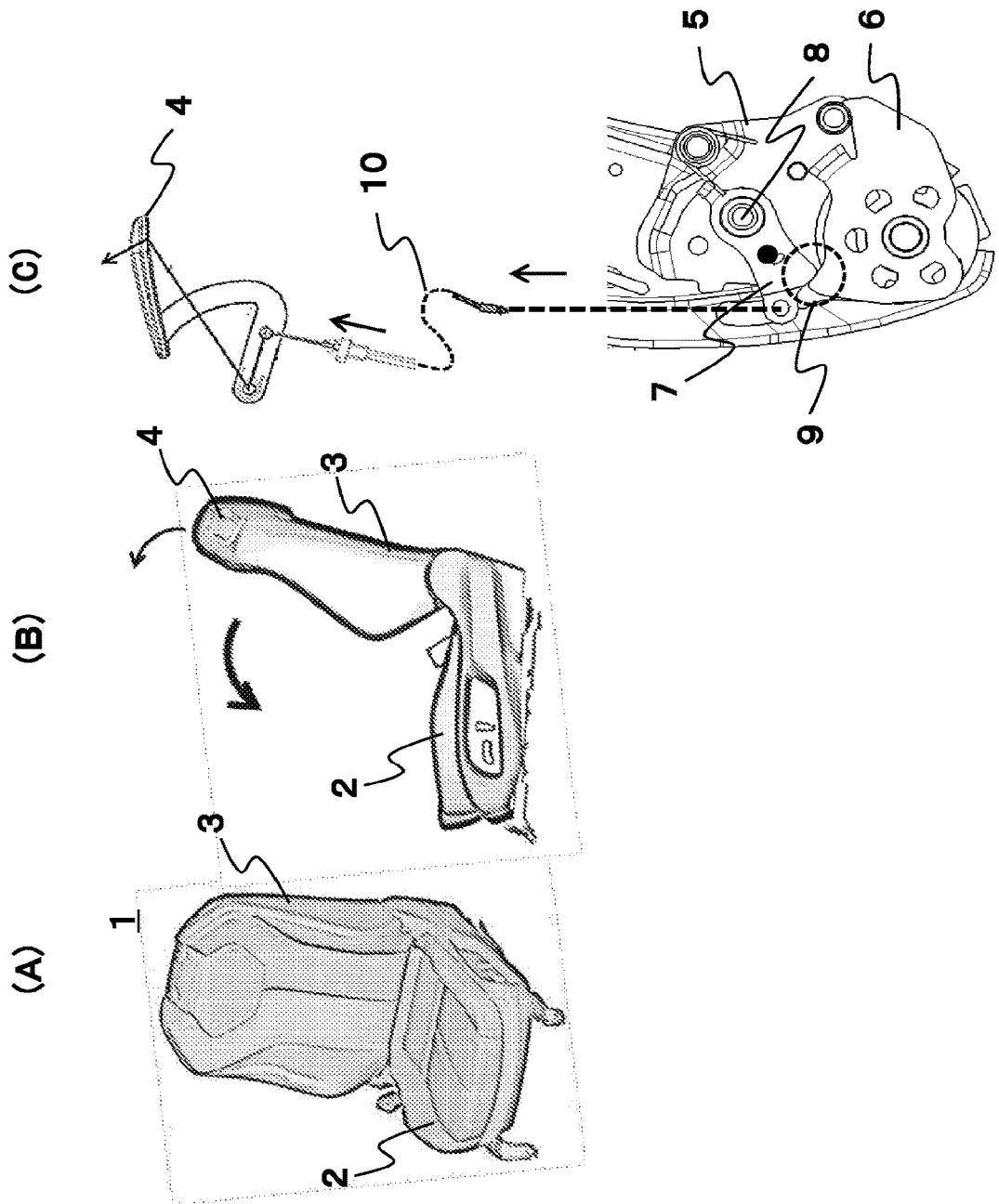
FIG. 3 includes explanatory drawings of a walk-in mechanism of a vehicle seat with the walk-in mechanism according to a conventional example.

First, a description will be given of a conventional vehicle seat with a walk-in mechanism as a prerequisite of the present invention. FIG. 3 includes explanatory drawings of the walk-in mechanism of the vehicle seat with the walk-in mechanism according to the conventional example. (A) illustrates a front perspective external view of the vehicle seat. A vehicle seat 1 includes a seat cushion 2 and a seat back 3. (B) illustrates a side view of the vehicle seat 1. The seat back 3 includes a lever 4 on its shoulder. The seat back 3 includes, what is called, the walk-in mechanism. The walk-in mechanism enables to release a lock of the seat back 3 by pulling the lever 4 upward to instantaneously make the seat back 3 fall forward such that, for example, an occupant on a rear seat can get in and out. (C) is a schematic configuration diagram for describing the walk-in mechanism. A reclining unit 5 including the walk-in mechanism is secured to the seat cushion 2 and the seat back 3, and is configured such that the seat back 3 turns about a coupling shaft with respect to the seat cushion 2. The reclining unit 5 includes a swing plate 6 and a latch 7 for locking the seat back 3 at a seating posture position. The latch 7 turns about a latch rotation shaft 8 and engages with the swing plate 6 via a meshing portion 9 to act to lock the turning of the seat back 3. The latch 7 is coupled to the lever 4 via a cable 10. Pulling the lever 4 upward pulls the latch 7 upward to disengage the latch 7 from the swing plate 6, and thus, the lock is released.

Here, the center of gravity of the latch 7 is positioned at a position indicated by a black circle in the drawing. In some cases, for example, a collision from a vehicle collision floats the latch by an inertia force, and releases the lock.

Accordingly, this example is configured such that the position of the center of gravity of the latch is brought close to a rotational center of the latch in order to solve the above-described problems. The following describes the example with reference to the drawings.

Figure 1:
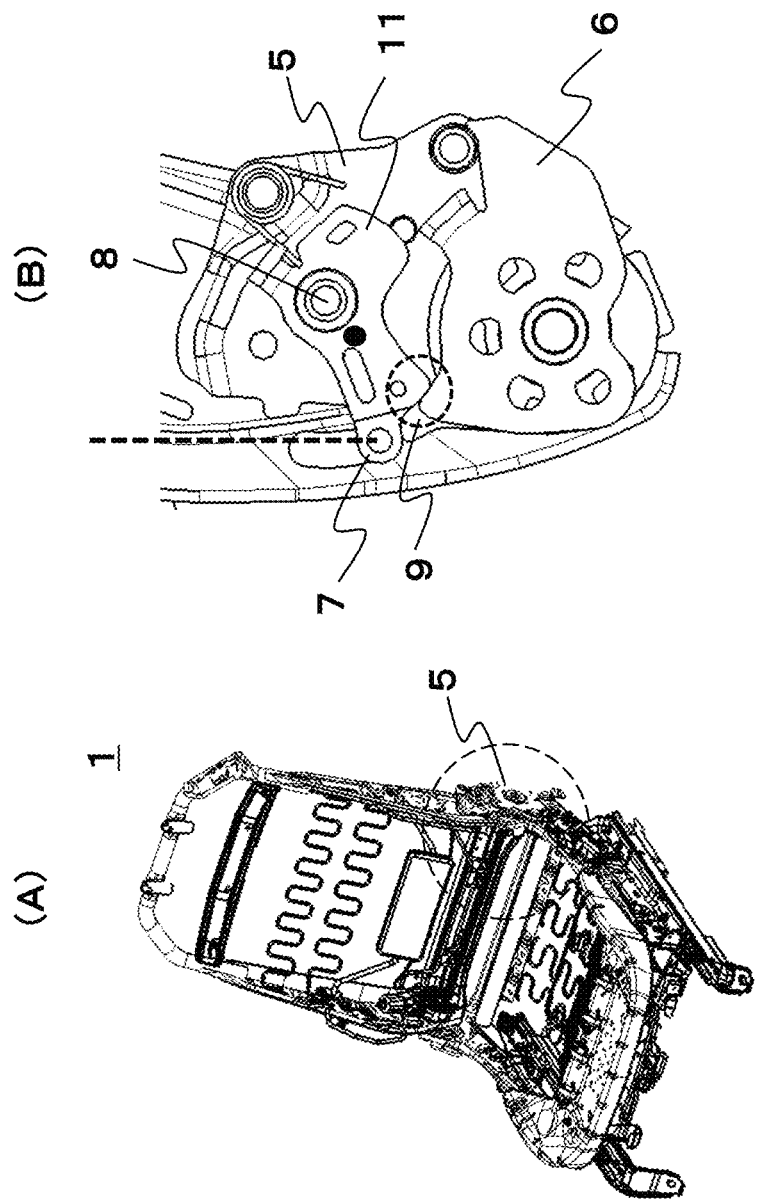
FIG. 1 includes structural drawings of a vehicle seat with a walk-in mechanism and a reclining unit according to an example.

FIG. 1 includes structural drawings of a vehicle seat with a walk-in mechanism and a reclining unit according to the example. In FIG. 1, (A) illustrates a frame structure of the vehicle seat 1. The reclining unit 5 is secured to a cushion side frame of the seat cushion 2 and a back side frame of the seat back 3. The seat back 3 is configured to turn about a coupling shaft with respect to the seat cushion 2.

FIG. 1(B) is a drawing that enlarges the reclining unit 5 enclosed in a circular dotted line in FIG. 1(A). FIG. 1(B) is different from the conventional example in FIG. 3(C) in that a counter plate 11 is added on the latch 7. That is, it is a structure in which the counter plate 11 is added to increase a weight on an opposite side of a side where the lever 4 of the latch 7 is coupled with respect to the latch rotation shaft 8 such that the position of the center of gravity of the latch 7 is brought close to the latch rotational center. In other words, it is a structure in which the latch 7 has the counter plate 11 added on the opposite side of the meshing portion 9 engaging with the swing plate 6 with respect to the latch rotation shaft 8 such that the position of the center of gravity of the latch 7 is brought close to the rotational center of the latch 7. This ensures the reduced generated torque in a lock off direction of the latch during a collision. The following describes the detail.

Figure 2:
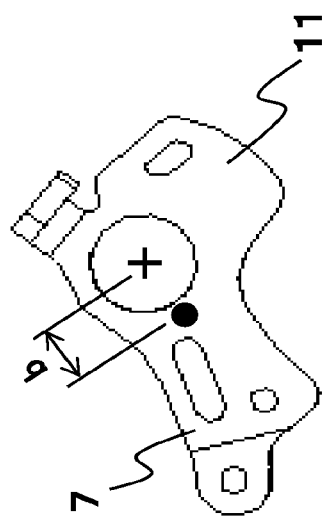
FIG. 2 includes explanatory drawings of an effect of a latch used in a lock mechanism of a seat back according to the example.
Figure 2:
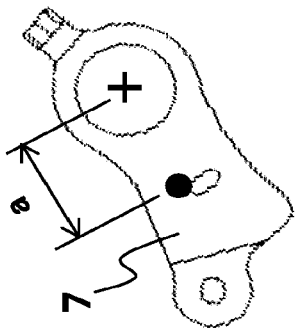

FIG. 2 includes drawings describing an effect of the latch used for the lock mechanism of the seat back according to the example. In FIG. 2, (A) illustrates the latch 7 of the conventional example and (B) illustrates the latch 7 of the example. Here, a torque generated in the latch 7 by the inertia force due to, for example, a vehicle collision is obtained from the following formula (1)

$$\text{Generated torque} = \text{latch weight} \times \text{position of center of gravity from rotational center} \quad (1)$$

That is, it is a value obtained by multiplying a distance from the rotational center of the latch to the position of the center of gravity of the latch by the latch weight. In FIG. 2, the respective latch rotational centers are indicated by +, and the respective positions of the center of gravity are indicated by black circles. The respective distances from the rotational centers to the positions of the center of gravity of the latches are indicated by a in the conventional example and b in this example as illustrated. Then, adding the counter plate 11 in this example ensures bringing the position of the center of gravity close to the rotational center, thereby ensuring a relationship of a>b. Accordingly, the torque generated in the latch 7 by the inertia force due to the vehicle collision can be reduced.

That is, for all the direction including an impact in a vertical direction thrusting upward by a vehicle floor broken in a vehicle collision and an impact in a front-rear direction, a rotating torque generated in the latch by the inertia force can be reduced. Therefore, the lock state can be further reliably retained.

It should be noted that, while in FIG. 2(B), the position of the center of gravity of the latch is displaced off from the rotational center, it is more preferable when they match.

Integrating the counter plate 11 with the latch 7 ensures reducing the number of components. The counter plate 11 may be made of a material with a heavy specific gravity, such as lead, by considering an issue of a space. The torque generated by the inertia force is proportionate to the latch weight, and therefore, a hole may be made for a weight reduction after ensuring strength.

As described above, this example is configured such that the position of the center of gravity of the latch is brought close to the rotational center of the latch. This ensures providing the vehicle seat with the walk-in mechanism including the lock mechanism of the seat back that ensures reducing the torque of the latch by the inertia force generated due to a collision or the like so as to further reliably retain the lock state against the impacts from any directions.

While the example has been described above, the present invention is not limited to the above-described examples, and includes various modifications. The above-described examples are described in detail for simply describing the present invention, and do not necessarily include all the described configurations. A part of the configurations of the example can be replaced by the configuration of another example.

REFERENCE SIGNS LIST

1 . . . vehicle seat,
2 . . . seat cushion,
3 . . . seat back,
4 . . . lever,
5 . . . reclining unit,
6 . . . swing plate,
7 . . . latch,
8 . . . latch rotation shaft,
9 . . . meshing portion,
10 . . . cable,
11 . . . counter plate.

The invention claimed is:

1. A vehicle seat with a walk-in mechanism, comprising:
   a reclining unit that includes the walk-in mechanism,
   wherein the reclining unit includes a swing plate and a latch for locking a seat back at a seating posture position,
   the seat back has a lever connected to the latch at a shoulder,
   the latch is disposed closer to the lever than the swing plate is to the lever,
   the latch has a structure that turns about a latch rotation shaft, locks the turning of the seat back by engaging with the swing plate, the latch is lifted by pulling up the lever connected to the latch, and releases the lock by disengaging from the swing plate, and the latch has a structure in which a counter plate is added on an opposite side of a position where the latch engages with the swing plate with respect to the latch rotation shaft and on an opposite side of a side where the lever is connected so that a position of a center of gravity of the latch is close to a rotational center of the latch.

2. The vehicle seat with the walk-in mechanism according to claim 1,
wherein the counter plate is integral with the latch.

3. The vehicle seat with the walk-in mechanism according to claim 1,
wherein the counter plate is made of a material different from a material of the latch.

4. The vehicle seat with the walk-in mechanism according to claim 1,
wherein the latch has a hole for weight reduction.

5. The vehicle seat with the walk-in mechanism according to claim 1,
wherein the position of the center of gravity of the latch approximately matches the rotational center of the latch.

\* \* \* \* \*